United States Patent

Goette et al.

[11] Patent Number: 5,771,745
[45] Date of Patent: Jun. 30, 1998

[54] GEAR ARRANGEMENT HAVING A MAGNETIC TOOTHED DISK

[75] Inventors: Timo Goette; Helmut Goebbels, both of Gifhorn, Germany

[73] Assignee: Volkswagen AG, Welfsburg, Germany

[21] Appl. No.: 641,824

[22] Filed: May 2, 1996

[30] Foreign Application Priority Data

Oct. 5, 1995 [DE] Germany .................. 195-17-043.1

[51] Int. Cl.⁶ .................................................. F16H 55/18
[52] U.S. Cl. ........................... 74/440; 74/443; 74/DIG. 4
[58] Field of Search ............................ 74/409, 440, 443, 74/DIG. 4, DIG. 10

[56] References Cited

U.S. PATENT DOCUMENTS

| 1,629,564 | 5/1927 | White | 74/440 |
| 2,172,416 | 9/1939 | Swenson | 74/440 |
| 4,519,264 | 5/1985 | Inui | 74/409 |
| 4,577,525 | 3/1986 | Ikemoto et al. | 74/440 |

FOREIGN PATENT DOCUMENTS

| 2508513 | 9/1976 | Germany . | |
| 3934377 | 5/1990 | Germany . | |
| 4400874 | 9/1994 | Germany . | |
| 1-98762 | 4/1989 | Japan | 74/DIG. 4 |
| 1-153865 | 6/1989 | Japan | 74/440 |
| 1486663 | 6/1989 | U.S.S.R. | 74/DIG. 4 |

*Primary Examiner*—Charles A. Marmor
*Assistant Examiner*—Troy Grabow
*Attorney, Agent, or Firm*—Baker & Botts, L.L.P.

[57] ABSTRACT

A gear arrangement which prevents clattering or rattling noises associated with the engagement of gear teeth with another gear includes a gear and a magnetic toothed disk engaging one side of the gear and having the same diameter as the gear and a different number of teeth than the gear.

6 Claims, 1 Drawing Sheet

GEAR ARRANGEMENT HAVING A MAGNETIC TOOTHED DISK

BACKGROUND OF THE INVENTION

This invention relates to gear arrangements having magnetic components.

As disclosed for example in German Offenlegungsschrift No. 39 34 377, gear systems frequently suffer from rattling noises which are caused by irregularities in the operation of the drive engine and by play of the teeth of the engaging gears. In order to prevent such gear noises, it is proposed in that document to provide a disk made from elastomeric material on the front side of at least one of two engaging gears, the elastomeric disk having teeth which, together with the metal teeth of the associated gear, engage the teeth of a second gear. The elastomeric teeth are slightly oversized relative to the metal teeth of the first gear so that they take up the play between the engaging gear teeth.

Although rattling and clattering noises of a gear system can advantageously be prevented by this arrangement, the elastomeric toothed disk which is associated with the first gear wears relatively quickly. As a result, the gear noises which are intended to be prevented occur again after just a short period of operation.

Moreover, German Offenlegungsschrift No. 44 00 874 discloses the magnetization of two mating gears in such a way that the opposed engaging teeth of the two gears have the same polarity. Thus, the tooth flanks, for example, of a gear which is fixed on a shaft and of a rotationally supported gear are constantly mutually repelled by the magnetic force, so that the tooth flanks of the gears are in contact only when a transfer of force between the gears is taking place.

A drawback with this arrangement is that, when large fluctuations in torque occur in the gear system, the magnetic forces are not sufficient to prevent contact between the teeth and hence to prevent the aforementioned gear noises.

SUMMARY OF THE INVENTION

Accordingly, it is an object of the present invention to provide a gear arrangement which overcomes the disadvantages of the prior art.

Another object of the invention is to provide a gear arrangement in which disturbing noises are reliably eliminated.

These and other objects of the invention are attained by providing a gear arrangement in which a gear is provided with an associated magnetic toothed disk having the same outer diameter as the gear and having a different number of teeth than the associated gear.

In a preferred embodiment the gear carries the magnetic toothed disk on one of its side surfaces and the number of teeth in the magnetic disk is preferably less than the number of teeth in the gear itself. This combination of a magnetic toothed disk with a number of teeth which is different from that in the gear produces the effect that, when engagement takes place between the gear teeth and the teeth of a further gear, the teeth of the further gear are attracted by the tooth flanks of the magnetic disk associated with the first gear so that rattling or chattering of the tooth flanks is avoided.

If the magnetic toothed disk has at least one tooth fewer than the associated gear, the toothed disk, when engaged with another gear along with its associated gear, must rotate faster than the gear with which it is associated. As a result of this minor speed differential and the adhesive friction resulting from magnetic attraction between the gear and its associated toothed disk, a drag torque is generated. This drag torque acts upon the further gear which engages the combination of the first gear and the toothed disk and causes the respective tooth flanks of the gears and the toothed disk to remain constantly in contact. It is particularly advantageous if the toothed disk is disposed on a gear which is fixed to its support shaft.

In a particular embodiment of the invention, the toothed disk is disposed on a hub of large or small diameter which is offset from the associated gear and the disk may be positioned on the hub with fastening members such as securing elements. In another embodiment, the toothed disk, like the side surface of the gear with which it is associated, extends down to the diameter of a shaft which supports the gear and, where appropriate, is secured against axial motion on the support shaft for the gear by a securing component. Finally, it is also within the scope of the invention to provide engaging helical gears with a magnetic toothed disk which is disposed on the pressure side of one of the gears.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
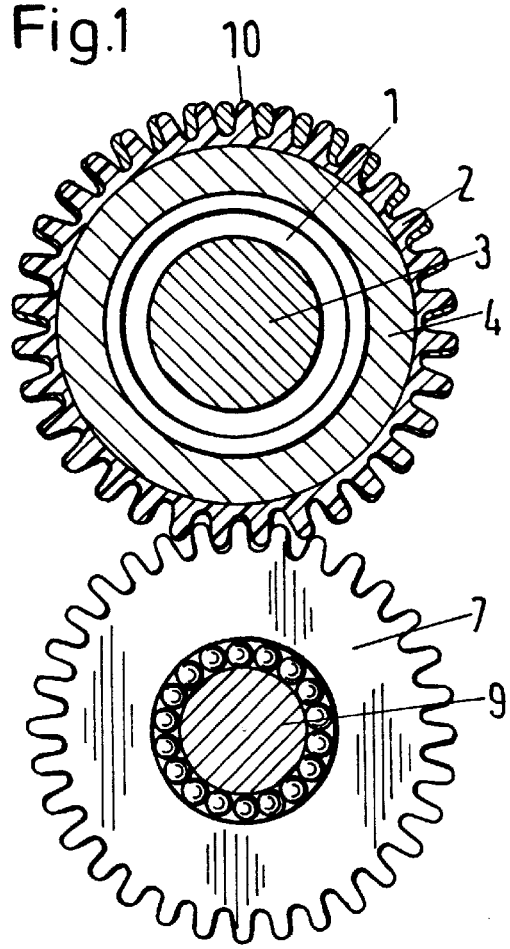
FIG. 1 is a diagrammatic side view showing a representative gear arrangement according to the invention including two engaging gears and a magnetic toothed disk.

In the typical embodiment shown in FIG. 1, two engaging gears 1 and 7 are disposed on corresponding shafts 3 and 9. The gear 1 is, in this example, a fixed gear, i.e., is secured to the shaft 3, and it has an offset hub 4. A magnetic disk 2 formed with teeth 10 is positioned against one side of the gear 1 and has the same diameter as the gear 2 but it has one tooth fewer than the number of teeth on the gear 1. Since the magnitude of a magnetic drag torque acting upon the gear 7 can be influenced by the area of the contact surface of the magnetic toothed disk 2 with the adjacent side of the gear 1, the radial diameter of the offset hub 4 of the gear 1 can be individually selected to produce a desired drag torque according to the relationships of the magnetic disk, the associated gear and a gear with which they are engaged.

Figure 2:
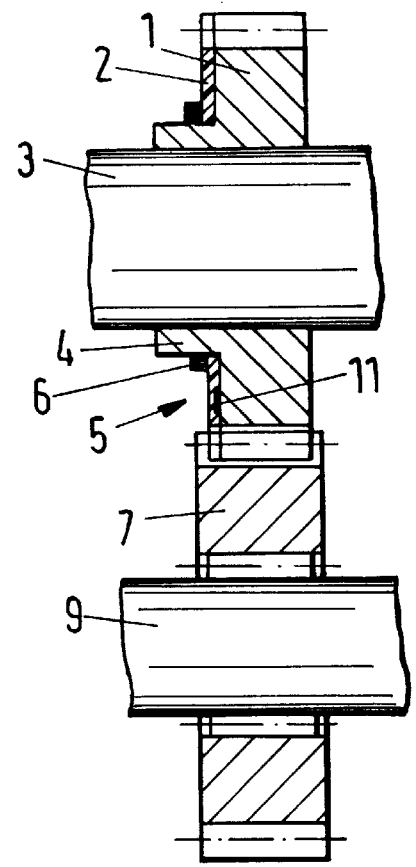
FIG. 2 is a vertical cross sectional view taken through the gear arrangement of FIG. 1.

The magnetic toothed disk 2 preferably consists of a plastic body incorporating a magnetic material and it can be supported by the offset hub 4 or by the shaft 3, and secured thereon against axial motion by a securing element 6 shown in FIG. 2. The provision of the securing element 6 may not be necessary if the gear 1 is a helical gear and the magnetic toothed disk 2 is disposed on the pressure side 5 of the gear 1.

Figure 3:
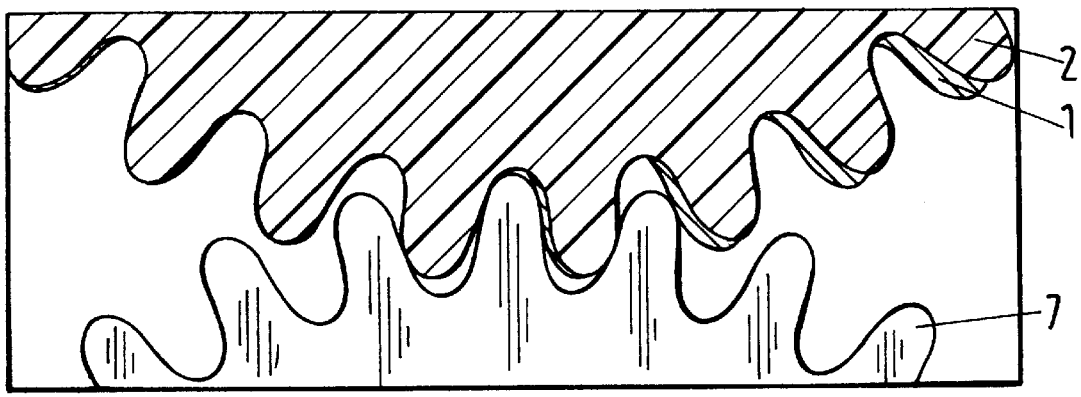
FIG. 3 is an enlarged fragmentary view of the engaging gear teeth shown in FIG. 1.

The operation of the magnetic toothed disk 2 in the gear arrangement of the invention is shown in detail in FIG. 3. As this representation illustrates, the combination of the magnetic attraction between the toothed disk 2 and the gear 1 and the different number of teeth has the effect that the teeth of the other gear 7 are always in contact with teeth of the gear 1 or of the toothed disk 2. Clattering of the gears is thereby effectively prevented. This improvement results from the differing number of teeth on the gear 1 and on the magnetic toothed disk 2 and on the displacement of the toothed disk 2 with respect to the gear 1 in the region in which the teeth are in engagement, which results in transfer of a drag torque to the gear 7, effectively absorbing even large torque shocks.

In a further representative embodiment of the invention, the toothed disk 2 consists of a nonmagnetic material, for example a plastic, to which or in which one or more segments 11 made from a magnetic material are embedded and/or fastened.

Although the invention has been described herein with reference to specific embodiments, many modifications and variations therein will readily occur to those skilled in the art. Accordingly, all such variations and modifications are included within the intended scope of the invention.

We claim:

1. A gear arrangement comprising a gear having a number of teeth and a magnetic toothed disk disposed on one side of the gear and magnetically attracted thereto to provide frictional engagement therewith to resist relative rotation and having the same outer diameter as that of the gear and having a number of teeth which differs from the number of teeth of the gear and wherein the toothed disk has at least one tooth fewer than the gear in order to cause the teeth of the gear and of the disk to remain in contact with teeth of another gear engaging them.

2. A gear arrangement according to claim 1 including a gear shaft to which the gear is fixedly attached.

3. A gear arrangement according to claim 1 wherein the gear has an offset hub and wherein the toothed disk is supported on the offset hub.

4. A gear arrangement according to claim 1 wherein the toothed disk is retained against the side of the gear by a securing element.

5. A gear arrangement according to claim 1 wherein the gear is a helical toothed gear and the toothed disk is disposed on the pressure side of the gear.

6. A gear arrangement according to claim 1 wherein the toothed disk consists of a nonmagnetic material containing at least one magnetic segment.

* * * * *